United States Patent [19]

Boardman

[11] Patent Number: 5,145,190
[45] Date of Patent: Sep. 8, 1992

[54] GASKET ASSEMBLY

[75] Inventor: Thomas A. Boardman, Belmont, N.H.

[73] Assignee: Freudenberg-NOK, Plymouth, Mich.

[21] Appl. No.: 675,695

[22] Filed: Mar. 27, 1991

[51] Int. Cl.⁵ .............................................. F16J 15/12
[52] U.S. Cl. ................................. 277/166; 277/180; 277/189; 277/235 B
[58] Field of Search ................ 277/166, 180, 183, 184, 277/189, 235 B, 9, 11

[56] References Cited

U.S. PATENT DOCUMENTS

| | | | |
|---|---|---|---|
| 2,192,739 | 3/1940 | Goetze | 277/166 |
| 2,200,212 | 5/1940 | Bohmer, Jr. et al. | 277/180 |
| 2,339,478 | 1/1944 | Hoheisel | 277/180 |
| 2,339,479 | 1/1944 | McCreary | 277/180 |
| 2,795,444 | 6/1957 | Neuzell | 277/180 |
| 3,195,906 | 7/1965 | Moyers | 277/166 X |
| 3,215,442 | 11/1965 | Papenguth | 277/180 |
| 3,302,953 | 2/1967 | Glasgow | 277/180 |
| 3,560,007 | 2/1971 | Ascencio | 277/235 B |
| 3,565,449 | 2/1971 | Ascencio et al. | |
| 3,811,689 | 5/1974 | Farnam | 277/180 X |
| 3,871,668 | 3/1975 | Coker et al. | 277/180 |
| 4,026,565 | 5/1977 | Jelinek | 277/180 |
| 4,272,085 | 6/1981 | Fujikawa et al. | 277/235 B |
| 4,331,336 | 5/1982 | Czernik et al. | |
| 4,376,539 | 3/1983 | Baldacci | |
| 4,405,138 | 9/1983 | Skrycki | 277/235 B |
| 4,535,999 | 8/1985 | Locacius | |
| 4,711,456 | 12/1987 | Udagawa | |
| 4,856,796 | 8/1989 | Genin | |
| 4,955,621 | 9/1990 | Skrycki | |
| 4,976,225 | 12/1990 | Stang et al. | |
| 5,011,162 | 4/1991 | Jelinek | 277/180 X |
| 5,044,641 | 9/1991 | Belter | 277/235 B X |

FOREIGN PATENT DOCUMENTS

| | | | |
|---|---|---|---|
| 3718569 | 12/1988 | Fed. Rep. of Germany | 277/235 B |
| 3903918 | 8/1990 | Fed. Rep. of Germany | 277/235 B |
| 101577 | 5/1988 | Japan | 277/235 B |
| 214572 | 9/1988 | Japan | 277/235 B |
| 2092244 | 8/1982 | United Kingdom | 277/235 B |

Primary Examiner—William A. Cuchlinski, Jr.
Assistant Examiner—Scott W. Cummings
Attorney, Agent, or Firm—Dinnin & Dunn

[57] ABSTRACT

The present invention is a gasket assembly for sealing a gap between adjacent surfaces of mating components. The gasket assembly includes a core member having at least one opening extending therethrough. The gasket assembly also includes at least one seal member disposed in and circumscribing the opening. The gasket assembly further includes a plurality of tab members extending alternatingly into the opening for supporting the seal member between the tab members and within the opening.

18 Claims, 2 Drawing Sheets

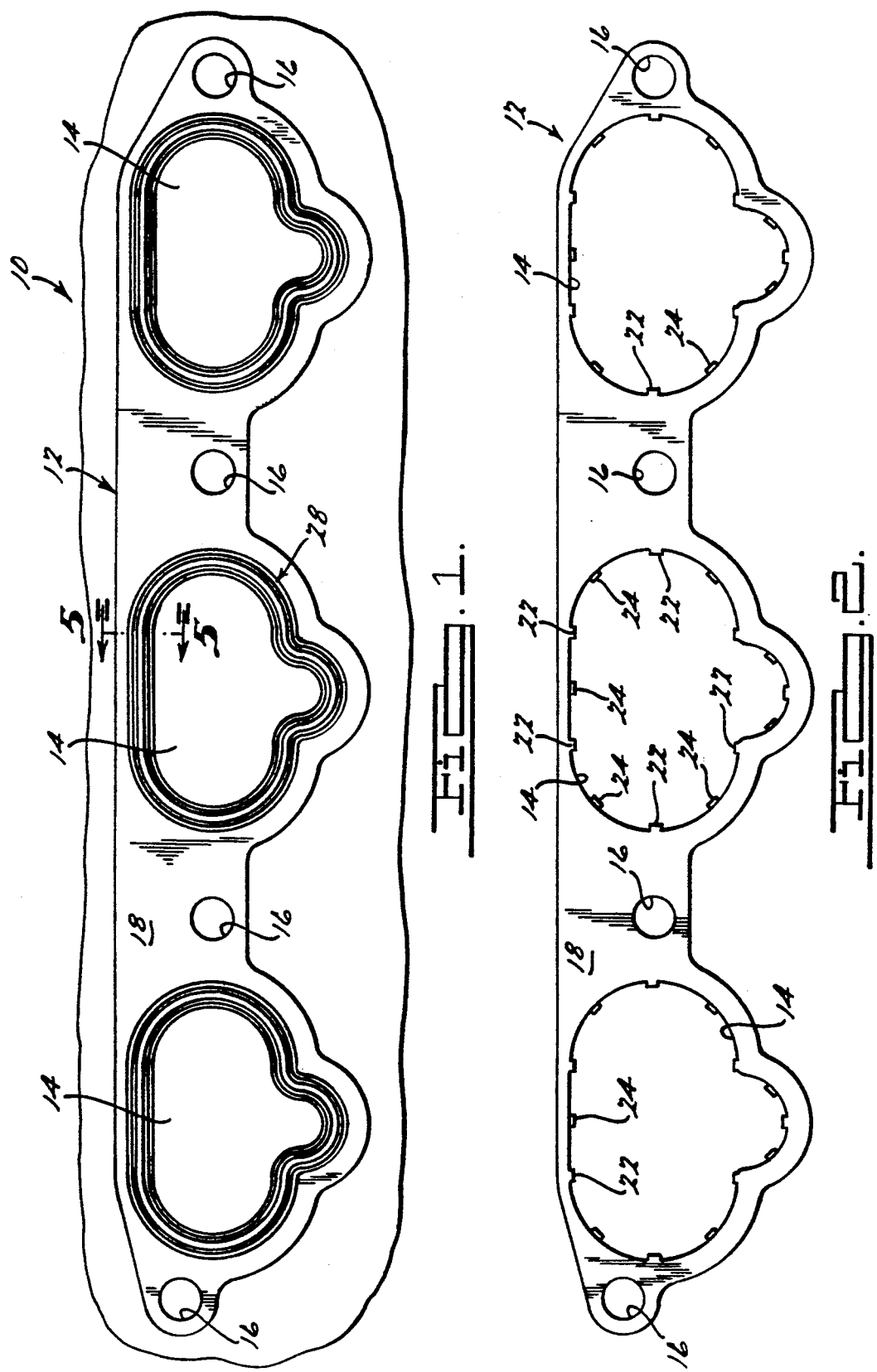

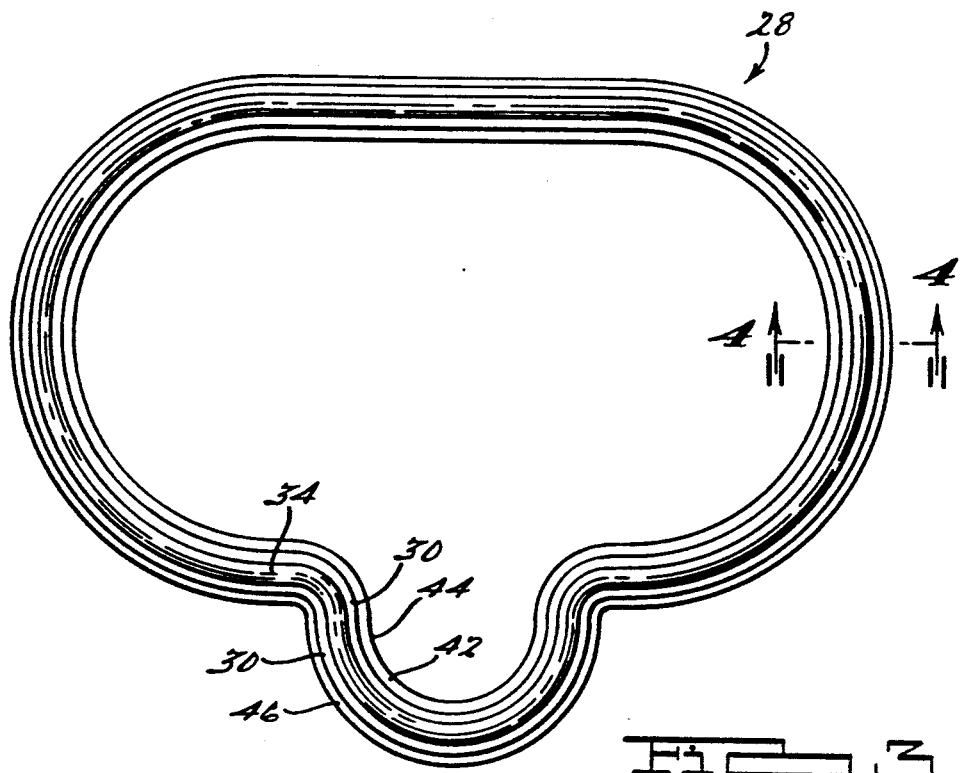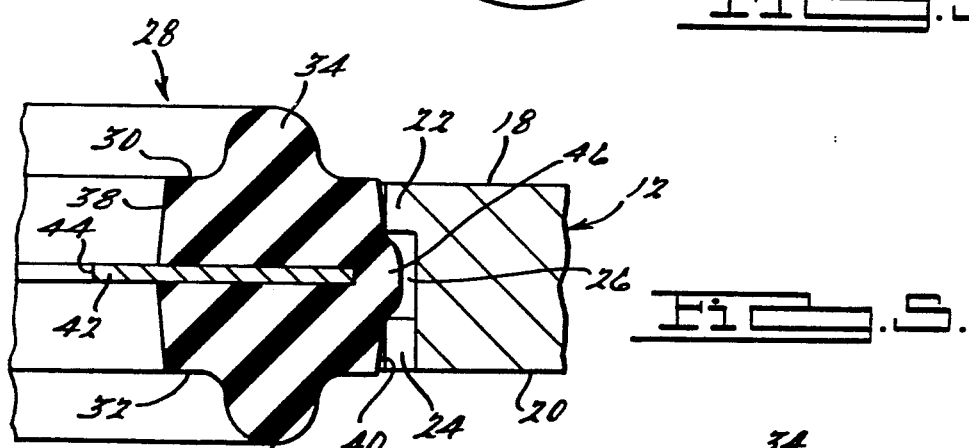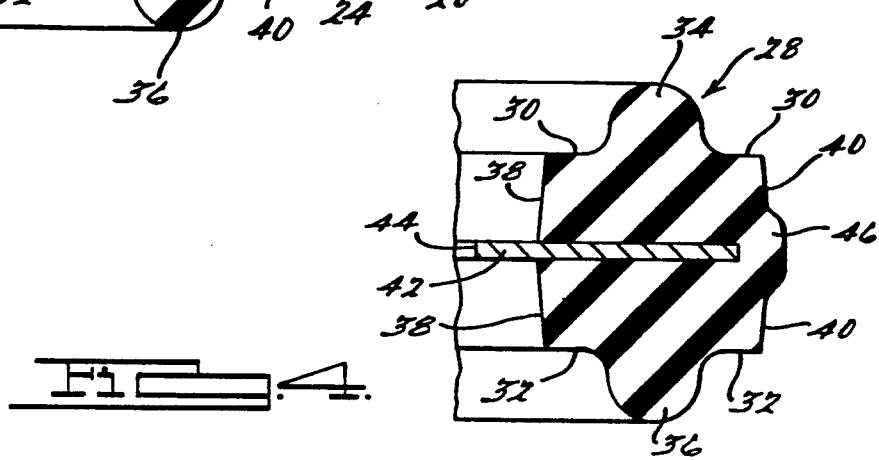

GASKET ASSEMBLY

BACKGROUND OF THE INVENTION

1. Field of the Invention

The present invention relates generally to gaskets, and more particularly to, a gasket assembly for sealing a gap between adjacent surfaces of mating components.

2. Description of Related Art

Commonly, gaskets are placed between a pair of adjacent surfaces of mating components such as an engine block and manifold, engine head, etc. to seal around apertures in the mating components. Examples of such gaskets may be found in U.S. Pat. Nos. 3,565,449 to Ascencio et al. and 4,976,225 to Stang et al. Typically, these gaskets are relatively flat members having a plurality of apertures. These gaskets are generally made of a two (2) piece construction.

In U.S. Pat. No. 3,565,449 to Ascencio et al., a main gasket body is a metal sheet with impregnated asbestos on each side. The main gasket body defines a plurality of combustion openings. A second gasket made of a U-shaped metal annulus is provided within the periphery defined by each of these openings. Tongs from the annulus project across a space between the second gasket and the periphery of the combustion opening to suspend and position the second gasket within the opening and on the main gasket body. The spaced tongs alternately overlie and underlie the main gasket body to suspend the second gasket.

One disadvantage of the Ascencio et al. patented gasket is that the second gasket is made of metal. Another disadvantage of this patented gasket is that the tongs overlie and underlie the main gasket body to produce an uneven outer surface. A further disadvantage of the patented gasket is that the main gasket is made of a fiber material which may weep where exposed to high temperatures.

In U.S. Pat. No. 4,976,225 to Stang et al., a gasket includes an inner section formed of sheet steel and encompassed by an outer section which is formed of an elastomeric material. The inner section is provided with one or more tongues which span the width of the gap between the inner and outer sections and interlockingly engage a complementary groove or slot formed in the outer section.

One disadvantage of the Stang et al. patented gasket is that the inner section is made of metal. Another disadvantage of this patented gasket is that the tongue may move vertically relative to the groove and such that the two sections become disengaged.

SUMMARY OF THE INVENTION

It is, therefore, one object of the present invention to provide a new and improved gasket for sealing a gap between adjacent surfaces of mating components.

It is another object of the present invention to provide a gasket assembly having a flexible seal member and a rigid core member.

It is yet another object of the present invention to provide a gasket assembly made of a two piece construction which eliminates a structure overlying and/or underlying the main gasket and provides a planar even outer surface.

It is a further object of the present invention to provide a gasket assembly made of a two piece construction having a locking structure which eliminates relative vertical movement between the two pieces.

It is yet a further advantage of the present invention to provide a gasket which will not weep or distort when exposed to high temperatures.

To achieve the foregoing objects, the present invention is a gasket for sealing a gap between adjacent surfaces of mating components. The gasket includes a core member having means forming at least one opening extending therethrough. The gasket also includes at least one seal member disposed in and circumscribing the opening. The gasket further includes means extending alternatingly into the opening for supporting the seal member between the means and within the opening.

One advantage of the present invention is that tab members extend into the opening to cooperate with the seal member, thereby eliminating overlapping and producing an even outer surface. Another advantage of the present invention is that the core member is made of rigid material and the seal member is made of an elastomeric material. Yet another advantage of the present invention is that the seal member cannot move vertically relative to the core member once installed. A further advantage of the present invention is that the gasket accommodates a large temperature range without distortion. A still further advantage of the present invention is its lower cost through tooling, design flexibility and avoidance of adhesive systems and close tolerance press-fits.

Other objects, features and advantages of the present invention will be readily appreciated as the same becomes better understood by those skilled in the art from reading the following description when taken in connection with the accompanying drawings.

BRIEF DESCRIPTION OF THE DRAWINGS

FIG. 1 is a plan view of a gasket assembly according to the present invention.

FIG. 2 is a plan view of a core member of the gasket assembly of FIG. 1.

FIG. 3 is a plan view of a seal member of the gasket assembly of FIG. 1.

FIG. 4 is a sectional view taken along line 4—4 of FIG. 3.

FIG. 5 is a sectional view taken along line 5—5 of FIG. 1.

DESCRIPTION OF THE PREFERRED EMBODIMENT(S)

Referring to FIG. 1, a gasket assembly 10 is shown according to the present invention. The gasket assembly 10 is typically disposed between mating components such as a manifold, engine head or an engine block (not shown). The mating components each have a mating surface and the gasket assembly 10 seals a gap between the adjacent mating surfaces of the mating components as is known in the art.

Referring to FIGS. 1, 2 and 5, the gasket assembly 10 includes a carrier or core member, generally indicated at 12. The core member 12 is generally flat or planar and extends longitudinally. The core member 12 is made out of a metal material such as steel. It should be appreciated that the core member 12 may be made of any suitable material for providing a desired stiffness such as rigid or flexible.

The core member 12 has at least one, preferably a plurality of enlarged openings 14 extending therethrough. The enlarged openings 14 are aligned with similar openings (not shown) on the mating components to allow gas such as air to flow. In the preferred embodiment, the core member 12 has three (3) enlarged openings 14. The core member 12 also includes at least one, preferably a plurality of fastener openings 16. In the preferred embodiment, four (4) fastener openings 16 are provided although the number may be varied. The fastener openings 16 allow a fastener such as a bolt to extend therethrough to secure the mating components and gasket assembly 10 together as a single unit.

Referring to FIGS. 2 and 5, the core member 12 also has a generally flat or planar top and bottom outer surfaces 18 and 20. The top and bottom outer surfaces 18 and 20 abut the adjacent mating surfaces of the mating components. The core member 12 also includes a plurality of tab members 22 and 24 disposed circumscribingly about the enlarged openings 14 of the core member 12. The tab members 22 and 24 are generally rectangular in shape and are integral with the core member 12. The tab members 22 extend from the top surface 18 and into the enlarged opening 14. The tab members 22 are spaced circumscribingly about the enlarged opening 14. The tab members 24 extend from the bottom outer surface 20 into the enlarged opening 14. The tab members 24 are spaced circumscribingly about the enlarged opening 14 such that at least one tab member 24 is disposed between at least a pair of spaced tab members 22. The tab members 22 and 24 have a width less than the width of the core member 12. The tab members 22 and 24 have a width that defines a generally rectangular gap 26 therebetween.

Referring to FIGS. 1 and 3 through 5, the gasket assembly 10 includes a gasket or seal member, generally indicated at 28. The seal member 28 has a generally rectangular cross-section and upper and lower outer surfaces 30 and 22. The seal member 28 also includes at least one seal bead 34 and 36 extending from the upper and lower outer surfaces 30 and 32, respectively. The seal beads 34 and 36 are generally arcuate in cross-section and integral with the remainder of the seal member 28. The seal beads 34 and 36 are circumscribingly continuous about the seal member 28. The seal beads 34 and 36 are adapted to cooperate with the adjacent surfaces of the mating components so that gaseous fluid flow through the enlarged openings 14 will not leak between the mating components.

The seal member 28 also has radial inner and outer surfaces 38 and 40, respectively. The seal member 28 includes an annular insert 42 partially disposed within the seal member 28. The insert 42 is made of a suitable material such as steel. The insert 42 extends radially outwardly from the inner surface 38 to form an opening 44. The seal member 28 also includes a locking bead or member 46 extending radially outwardly from the radial outer surface 40. The locking member 46 is generally trapezoidal in shape. The radial outer surface 40 slopes axially away from the locking member 46. The locking member 46 is adapted to be disposed in the gap 26 between the tab members 22 and 24. The seal member 28 is made of an elastomeric material such as rubber. It should be appreciated that the core member 12 and seal member 28 may be made of any suitable material such that the seal member 28 is rigid and the core member 12 is flexible or both members may be made of material having semi-flexible properties and the tab members of a yieldable material to allow assembly. It should also be appreciated that the locking member 46 may be formed on the core member 12 and the tab members 22 and 24 may be formed on the seal member 28.

In operation, the core member 12 may be formed by conventional molding or stamping. The seal member 28 may be formed by molding. The seal member 28 is flexed to fit within the opening 14 of the core member 12 such that the locking member 46 is disposed in the gap 26 between the tab members 22 and 24. When this occurs, the top and bottom outer surfaces 18 and 20 of the core member 12 are substantially even or planar with the upper and lower outer surfaces 30 and 32 of the seal member 28. The gasket assembly 10 is then placed between the mating components such as an intake manifold and engine block and secured by fasteners to prevent fluid leaks from occurring in the area therebetween.

Accordingly, the gasket assembly 10 seals the mating components and may be disassembled and reused numerous times without replacement. The gasket assembly 10 may be made of high temperature elastomer and metal or plastic which can handle a wider range of temperatures without distortion. The tab members 24 and 26 and locking member 46 of the gasket assembly 10 allow the gasket or seal member 28 to be molded in small, repeatedly used, pieces. The gasket assembly 10 is lower in tooling costs, design flexibility, and avoids adhesive systems to secure the seal member 28 to the core member 12 and close tolerance press fits to retain the seal member 28 to the core member 12.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than specifically described.

What is claimed is:

1. A gasket for sealing a gap between adjacent surfaces of mating components, comprising:
   a core member having a first and second outer surface and means forming at least one opening extending therethrough;
   at least one seal member disposed in and circumscribing said at least one opening; and
   means extending alternatingly into said at least one opening for supporting said seal member;
   wherein said supporting means comprises a plurality of tab members disposed circumferentially about said at least one opening and extending coplanar from said first and second outer surface, respectively, alternatingly into said at least one opening such that either one of said tab members of said first and second outer surface is disposed between a spaced pair of said tab members from the other said outer surface for supporting said seal member between said tab members and within said at least one opening.

2. A gasket as set forth in claim 1 wherein said seal member includes a first and second outer surface.

3. A gasket as set forth in claim 2 wherein said seal member includes at least one seal bead extending outwardly from said first and second outer surfaces.

4. A gasket as set forth in claim 3 wherein said at least one seal bead is circumferentially continuous about said seal member.

5. A gasket as set forth in claim 1 wherein said seal member has a radial inner and outer surface.

6. A gasket as set forth in claim 5 wherein said gasket includes a locking member extending radially outwardly from said radial outer surface.

7. A gasket as set forth in claim 6 wherein said radial outer surface slopes axially away from said locking member.

8. A gasket as set forth in claim 7 including an insert extending radially and partially within said seal member and radially outwardly into said at least one opening.

9. A gasket as set forth in claim 1 wherein said tab members are generally rectangular in shape.

10. A gasket as set forth in claim 9 wherein said tab members are integral with said core member.

11. A gasket as set forth in claim 10 wherein said tab members have a width less than the width of said core member.

12. A gasket as set forth in claim 1 wherein said core member is made of a rigid material.

13. A gasket assembly as set forth in claim 1 wherein said seal member is made of an elastomeric material.

14. A gasket assembly for sealing a gap between adjacent surfaces of mating components, comprising:
a core member having a first and second outer surface and means forming at least one opening extending therethrough;
at least one seal member disposed in and circumscribing said at least one opening;
a plurality of first and second tab members disposed circumferentially about said at least one opening and extending coplanar from said first and second outer surface, respectively, alternatingly into said at least one opening such that either one of said first and second tab members is disposed between at least a spaced pair of the other tab members for supporting said seal member between said first and second tab members and within said at least one opening;
said seal member having a radial inner and outer surface and including a locking member extending radially outwardly from said radial outer surface and disposed between said first and second tab members.

15. A gasket assembly as set forth in claim 14 wherein said radial outer surface slopes axially away from said locking member.

16. A gasket assembly as set forth in claim 17 wherein said seal member includes a first and second outer surface and at least one seal bead extending outwardly from said first and second outer surfaces.

17. A gasket assembly as set forth in claim 17 wherein said at least one seal bead is circumferentially continuous about said seal member.

18. A gasket assembly for sealing a gap between adjacent surfaces of mating components, comprising:
a core member having a first and second core outer surface and means forming at least one opening extending therethrough;
at least one seal member disposed in and circumscribing said at least one opening;
a plurality of first and second tab members disposed circumferentially about said at least one opening and extending coplanar from said first and second outer surface, respectively, alternatingly into said at least one opening such that either one of said first and second tab members is disposed between a spaced pair of the other tab members for supporting said seal member between said first and second tab members and within said at least one opening;
said seal member including a first and second seal outer surface
and at least one seal bead extending outwardly from said first and second seal outer surfaces;
said at least one seal bead is circumferentially continuous about said seal member and integral with a remainder of said seal member; and
said seal member having a radial inner and outer surface and a locking member extending radially outwardly from said radial outer surface and disposed between said first and second tab members, wherein said radial outer surface slopes axially away from said locking member.

* * * * *

UNITED STATES PATENT AND TRADEMARK OFFICE
CERTIFICATE OF CORRECTION

PATENT NO. : 5,145,190
DATED : September 8, 1992
INVENTOR(S) : Thomas A. Boardman It is certified that error appears in the above-identified patent and that said Letters Patent is hereby corrected as shown below:

Column 3, line 36, "22" should be -- 32 --.

Column 6, line 1, claim 16, "17" should be -- 15 --.

Column 6, line 1, claim 17, "17" should be -- 15 --.

Signed and Sealed this

Seventh Day of September, 1993

Attest:

BRUCE LEHMAN

Attesting Officer   Commissioner of Patents and Trademarks